G. F. HIXSON.
Improvement in Bee-Hives.
No. 131,613.  Patented Sep. 24, 1872.
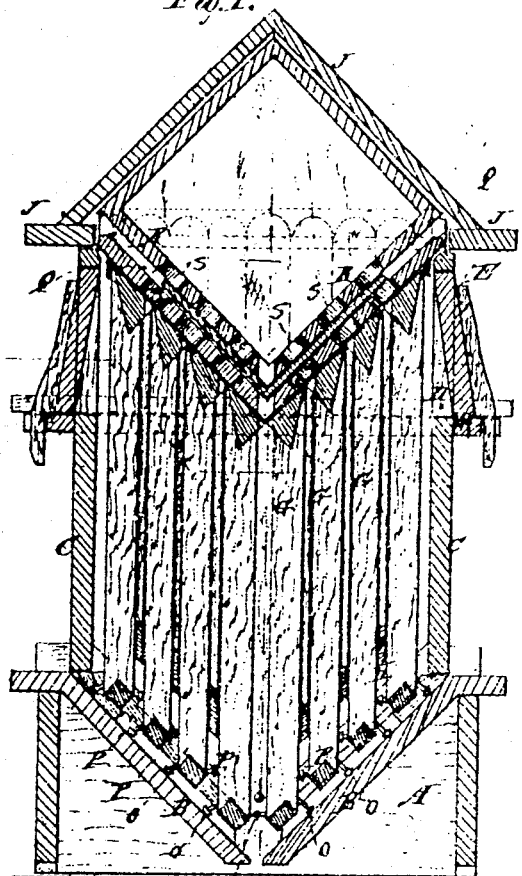
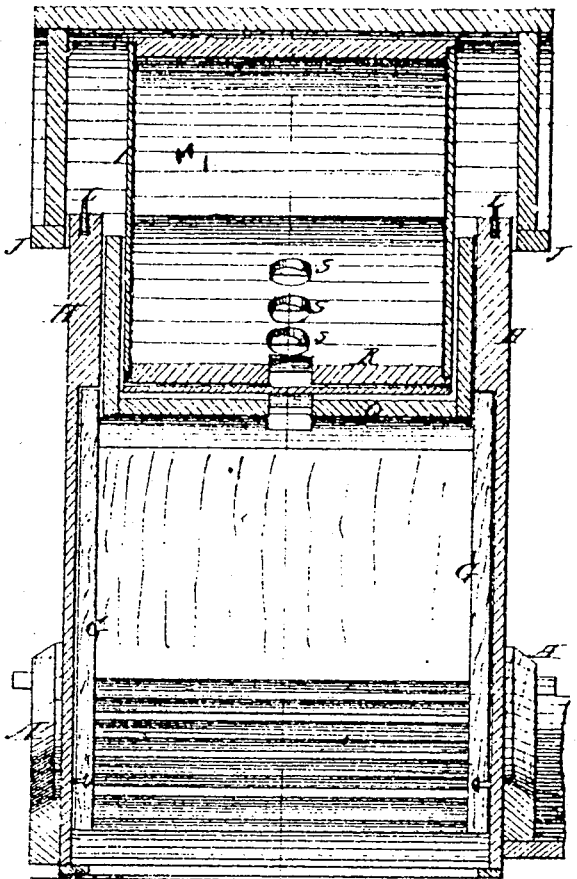
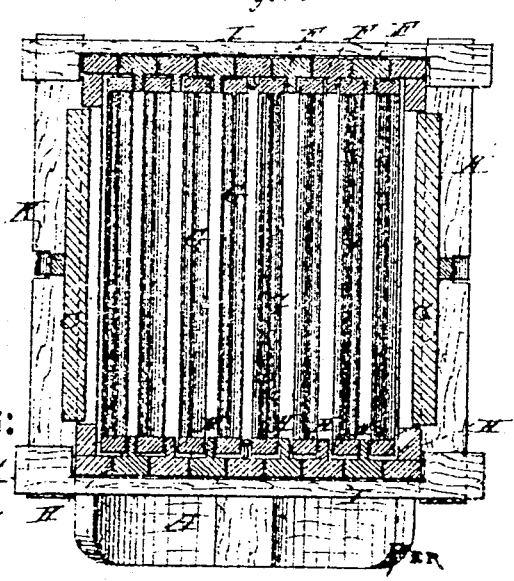
Witnesses:
Inventor:
Geo. F. Hixson
Attorneys.

131,613. BEE-HIVES. George F. Hixson, Gallipolis, Ohio.

*To all whom it may concern:*

Be it known that I, GEORGE F. HIXSON, of Gallipolis, in the county of Gallia and State of Ohio, have invented a new and Improved Bee-Hive, of which the following is a specification:

My invention comprises a peculiar construction and arrangement of the strips composing two of the sides of the hive with a view to facilitating opening of the case to examine the condition of the bees and comb, and to obviating the necessity for the use of other or separate means for preserving the proper spaces between the comb-frames. It also consists of a peculiar construction of the hive to adapt it for utilizing the animal heat of the bees for warming the honey-boxes, all as hereinafter more fully described.

Figure 1 is a sectional elevation of my improved hive taken on the line $x\ x$ of Fig. 2; Fig. 2 is a sectional elevation taken on the line $y\ y$ of Fig. 1; and Fig. 3 is a horizontal section.

Similar letters of reference indicate corresponding parts.

A represents the foundation and B the floor of the hive, which is inclined from the center upward in two directions at forty-five degrees, or thereabout. C represents the two sides of the case rising from the highest parts of the floor. These have each a large opening at D, closed by a removable door, E. The other two sides are composed of the narrow vertical boards F, all being detachable except the middle ones, each being as wide as the distance from center to center of the comb-frames G, and provided with a rib, H, on the inside, which fits in the space between two of the said frames, as clearly shown in Fig. 3, to make the sides sufficiently tight while allowing of the use of these narrow detachable boards for the side walls, which are employed for being removed, one at a time, to inspect the condition of the bees, and to afford access to the spaces between the combs for prying them straight in case they are found not to be so. The removal of so small a portion of the sides will not so materially disturb the bees as the taking off the whole of a side will, which is necessary as the hives are commonly constructed. The sides are held together by the bars I and the cap J, the latter being made large enough to drop down outside of the sides a short distance at the top, as shown in Figs. 1 and 2, and the latter hooking around the corners of the sides C, as shown in Fig. 3, and resting at the ends on the pieces K attached to said sides. The pieces F are still further secured in place by the thin metal plates I let into slots in the upper ends of the said pieces, and extending from one to the other so as to bind them all together. The comb frames have the bottom pieces M and the top pieces N constructed on the same angle as that of the floor, as shown in Fig. 1; and they are supported a little above the floor, to allow the bees to pass under them, by little stud-pins O; and they are also separated from each other at the lower ends by other stud-pins, P. At the upper ends they are separated by the slanting honey-board Q, which, like the floor, is arranged in two parts, inclined to the horizon and at right angles to each other, the object of which is to receive the square honey-box R within the space occupied by the bees, in the manner shown in Fig. 1, to be warmed by the natural heat of the bees, so that honey-boxes may be used in cold weather. Access is afforded to the honey-box for the bees from below through the holes S. Said holes may be closed at any time by thin plates T, of glass or any other substance, placed between the honey-box and the board Q.

Good results may be had with hives having only one side made of the detachable boards E; but I prefer to construct two of them in this way; and all the said boards of a side may be detachable, if preferred.

Having thus described my invention, I claim as new and desire to secure by Letters Patent—

1. In a bee-hive, the longitudinal removable strips F, provided with central ribs H, in combination with the comb-frames G, as specified, said strips thus forming both the side of the hive and supports or spaces for the frames.

2. The frames G and honey-box, arranged as shown and described, to increase the effect of the heat in the box, as set forth.

GEORGE F. HIXSON.

Witnesses:
SAMUEL H. BROWN,
CHARLES STUART.